(12) United States Patent
Healy et al.

(10) Patent No.: US 10,866,127 B2
(45) Date of Patent: Dec. 15, 2020

(54) DUAL CLASS ULTRASONIC GAS METERS AND RELATED FLOWTUBES

(71) Applicant: Sensus Spectrum, LLC, Morrisville, NC (US)

(72) Inventors: David Healy, Suffolk (GB); Benjamin John Sokol, Carrboro, NC (US); Hilary Jane Meanwell, Essex (GB); Eric Frazee, Holly Springs, NC (US); Charlie Paterson, Cambridgeshire (GB)

(73) Assignee: Sensus Spectrum, LLC, Morrisville, NC (US)

( * ) Notice: Subject to any disclaimer, the term of this patent is extended or adjusted under 35 U.S.C. 154(b) by 43 days.

(21) Appl. No.: 16/252,026

(22) Filed: Jan. 18, 2019

(65) Prior Publication Data
US 2020/0232828 A1 Jul. 23, 2020

(51) Int. Cl.
*G01F 1/66* (2006.01)
*G01F 15/00* (2006.01)

(52) U.S. Cl.
CPC ............ *G01F 1/662* (2013.01); *G01F 15/002* (2013.01)

(58) Field of Classification Search
CPC ............ G01F 1/66; G01F 1/88; G01F 15/002
See application file for complete search history.

(56) References Cited

U.S. PATENT DOCUMENTS

| | | | |
|---|---|---|---|
| 5,257,538 A | 11/1993 | Spendell | |
| 5,383,369 A | 1/1995 | Khuri-Yakub et al. | |
| 5,464,039 A | 11/1995 | Bergamini | |
| 5,728,948 A | 3/1998 | Bignell et al. | |
| D415,440 S | 10/1999 | Beadsworth | |
| 6,453,757 B1 | 9/2002 | Montag et al. | |
| 7,360,450 B2 * | 4/2008 | Muller | G01F 1/662 73/861.28 |
| 7,600,436 B2 * | 10/2009 | Hoecker | G01F 1/3209 73/861.22 |
| 9,080,906 B2 | 7/2015 | Sorensen et al. | |
| 9,671,793 B2 * | 6/2017 | Atherton | G01F 1/74 |
| 9,970,799 B2 | 5/2018 | Nielsen et al. | |

(Continued)

FOREIGN PATENT DOCUMENTS

| | | |
|---|---|---|
| CN | 207 963 973 U | 0/2018 |
| CN | 101 672 672 A | 3/2010 |
| WO | WO 2018/133462 A1 | 7/2018 |

OTHER PUBLICATIONS

Notification of Transmittal of the International Search Report and the Written Opinion of the International Searching Authority, or the Declaration, PCT/IB2019/057297, dated Dec. 29, 2019, 15 pages.

*Primary Examiner* — Jewel V Dowtin
(74) *Attorney, Agent, or Firm* — Stanek Lemon Crouse & Meeks, PA (57) ABSTRACT

An ultrasonic meter configured to operate in multiple classes is provided including a flowtube having an inlet at a first end and an outlet at a second end, opposite the first end; and first and second face to face transducers, the first transducer being positioned at the first end of the flowtube and the second transducer being positioned at the second end of the flowtube, wherein the first and second face to face transducers are positioned in line with flow through the ultrasonic meter. Related flowtubes are also provided herein.

20 Claims, 13 Drawing Sheets

(56) References Cited

U.S. PATENT DOCUMENTS

| | | |
|---|---|---|
| 10,197,432 B2 | 2/2019 | Mo et al. |
| 10,276,917 B2 | 4/2019 | Christiansen et al. |
| 2016/0258798 A1* | 9/2016 | Muhammad .............. F02C 9/28 |
| 2018/0136024 A1* | 5/2018 | Sonnenberg ............ G01F 15/00 |

* cited by examiner

DUAL CLASS ULTRASONIC GAS METERS AND RELATED FLOWTUBES

FIELD

The present inventive concept relates generally to meters and, more particularly, to meters capable of operating in multiple flow classes.

BACKGROUND

Utilities use meters to track usage of gas, water, electric and the like. Meters are generally installed on an exterior of a building to allow the meters to be accessed for such things as reading and maintenance. Each meter is specific to the function it provides. For example, a water meter may have a different design from a gas meter, both designed to optimize the purpose of the specific meter. Meters may be manufactured in different classes, one class directed to low flow accuracy and another may be directed for limiting pressure drop at high flow and the like. Thus, meter manufacturers have to manufacture and maintain supplies of each type of meter so that the meters can be available upon customer demand.

SUMMARY

Some embodiments of the present inventive concept provide an ultrasonic meter configured to operate in multiple classes including a flowtube having an inlet at a first end and an outlet at a second end, opposite the first end; and first and second face to face transducers, the first transducer being positioned at the first end of the flowtube and the second transducer being positioned at the second end of the flowtube, wherein the first and second face to face transducers are positioned in line with flow through the ultrasonic meter.

In further embodiments, positioning the first and second transducers face to face may increase the difference between the upstream and downstream sound wave velocities in the flowtube, leading to increased measurement sensitivity In still further embodiments, a length of the flowtube from a face of the first transducer to a face of the second transducer may be configured to be as short as possible without having an effect on flow accuracy through the flowtube.

In some embodiments, a diameter of the flowtube may have a similar size relative to a size of faces of the first and second transducers.

In further embodiments, the inlet of the flowtube may be configured to induce radially symmetric flow of a medium through the flowtube.

In still further embodiments, the outlet of the flowtube may be configured to decelerate the flow.

In some embodiments, the outlet of the flowtube may be configured to decrease flow velocity radially outward in all directions.

In further embodiments, the meter may further include a flow conditioner positioned in the flowtube.

In still further embodiments, the ultrasonic meter may be an ultrasonic gas meter.

In some embodiments, the ultrasonic meter may be configured to operate in both 200 and 400 flow classes.

Related flowtubes are also provided herein.

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed in the background, there are many different kinds of meters. Meters are manufactured in different classes, each class of meters being directed to a different aspect of the flow through the meter. For example, Sensus offers two meters, one meter (R275) for 200 class flow and one meter (R415) for 400 class residential use. Both of these existing meters are diaphragm style mechanical meters. However, recent developments in ultrasonic sensor production, it is no longer cost prohibitive to design solid state ultrasonic meters for residential use. Accordingly, embodiments of the present inventive concept provide a single meter that fulfills the requirements of both 200 and 400 class flows. Providing both capabilities in a single meter may provide a cost savings to the manufacturer.

As used herein, an "ultrasonic flow meter or ultrasonic meter" refers to a type of meter that measures the velocity of a fluid, for example, gas or water, with ultrasound to calculate volume flow. Using ultrasound to calculate volume flow is different than in a conventional mechanical meter that measure flow using an arrangement of moving parts.

As will be discussed further below, some embodiments of the present inventive concept provide a dual class residential ultrasonic gas meter (hereinafter "dual class meter") capable of meeting requirements for both 200 and 400 class meters. In particular, the specifications of the 200 class meter drove requirements in the dual class meter for low flow accuracy and the specification of the 400 class drove requirements in the dual class meter for high flow pressure drop as will be discussed further below with respect to FIGS. 1 through 9.

Figure 1:
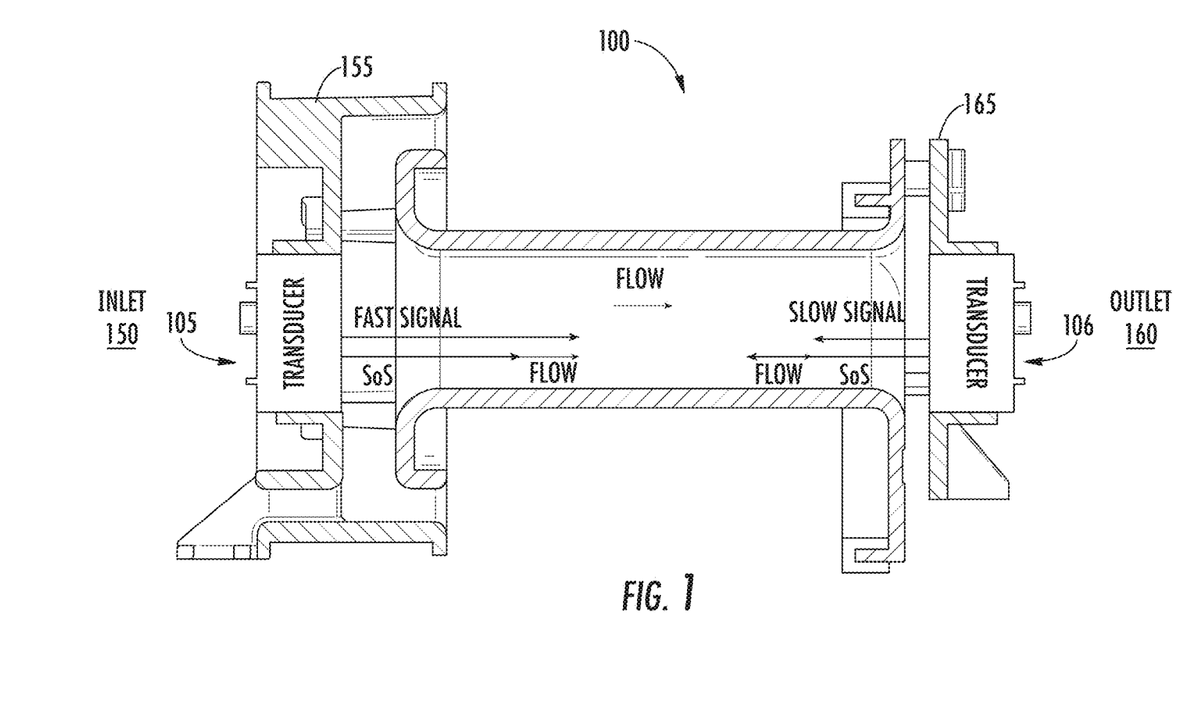
FIG. 1 is a diagram illustrating a cross section of a flowtube in accordance with some embodiments of the present inventive concept.
Figure 2A:
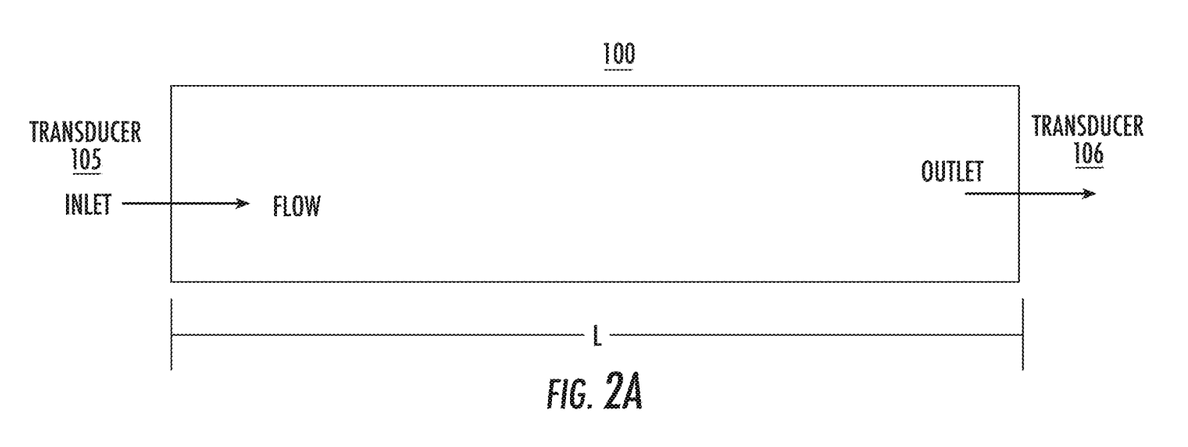
FIGS. 2A and 2B are diagrams illustrating cross sections of the flowtube in accordance with some embodiments of the present inventive concept.
Figure 2B:
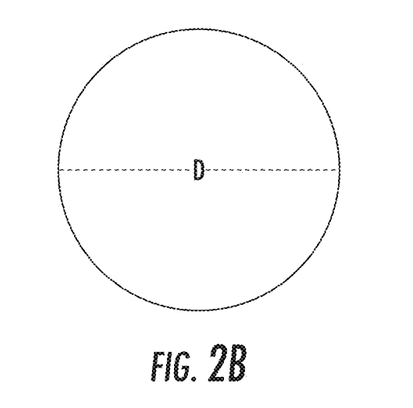
Figure 7A:
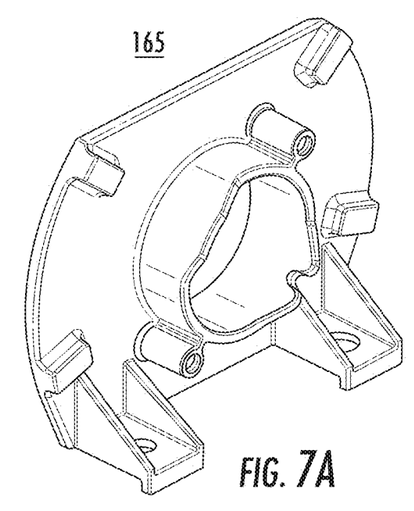
FIG. 7A is a plan view of the outlet portion of the flowtube in accordance with some embodiments of the present inventive concept.

Referring first to FIG. 1, a cross section of a flowtube 100 for the dual class residential meter (140 in FIG. 4) in accordance with some embodiments of the present inventive concept will be discussed. As illustrated in FIG. 1, the flowtube 100 includes first and second transducers 105 and 106, respectively, positioned "face to face." The first transducer 105 is placed at the inlet 150 of the flowtube 100 and the second transducer 106 is placed at the outlet 160 of the flowtube 100. As shown by the arrows in FIG. 1, gas enters the flowtube 100 on the left (inlet 150—transducer 105) through the baffle 155 (FIG. 3A) and flows to the right to the outlet 160 (see arrow "flow") through the outlet plate 165 (FIG. 7A). The flow of gas through the flowtube 100 impedes the progress of a sound wave (SoS—speed of sound) traveling upstream from the transducer 106 and quickens the downstream wave. While this is fundamental to all ultrasonic flow measurement, placing the transducers in line with the "flow" increases, and possibly maximizes, the affect on the sound wave. When the transducer path is at an angle to the flow path, i.e. not in line with the flow as discussed herein, the signal speed may be less affected and result in less sensitivity. Thus, aligning the transducers 105 and 106 with the flow as discussed herein improves performance in order to meet low flow requirements.

The flowtube 100 has multiple design aspects that allow the meter to operate in dual classes. As discussed above, the transducers 105 and 106 are positioned in line with the flow of gas through the flowtube 100. Positioning the transducer signal path in line with the flow through the flowtube 100 increases and, possibly maximizes, the sound wave velocity change at all flow rates. The increased shift results in better sensitivity at low flows, allowing the meter to meet 200 class low flow accuracy requirements.

The length (L—FIG. 2A) of the flowtube is a design tradeoff with respect to selecting a frequency for the transducers 105 and 106. In other words, the shorter a length L of the flowtube 100, the higher the frequency requirements for the transducers. In some embodiments of the present inventive concept, the transducer frequency is chosen to provide the shortest possible flowtube length L, while still maintaining low flow accuracy and a feasible flowtube diameter (D—FIG. 2B). For example, in some embodiments the length L of the flowtube may be from about 50 to about 100 mm and the corresponding transducer frequency may be from about 350 to about 550 kHz, respectively. In these embodiments, a diameter of the flowtube may be from about 10 to about 25 mm without departing from the scope of the present inventive concept. In some embodiments, the length L is defined from transducer face 105 to transducer face 106. Positioning the first 105 and second 106 transducers face to face may increase the difference between the upstream and downstream sound wave velocities in the flowtube 100, leading to increased measurement sensitivity.

It will be understood that these values are provided for example only and that embodiments of the present inventive concept are not limited thereto. For example, if the operating frequency is about 400 kHz, the diameter D of the flowtube may be about 17 mm and the length L may be about 70 mm. Design and management of the dimensions of the flowtube 100 is dependent on a number of variables that are managed with respect to a target performance specification. Thus, each of these measurements is subject to change based on the application.

A shorter flowtube length L generally results in a lower pressure differential required to drive 425 cubic feet of gas per hour through the flowtube 100. However, if a length L of the flowtube 100 is too short, there would not be a significant sound wave time of flight (ToF) change resulting in poor metrology sensitivity. As used herein, "ToF of time of flight" refers to a time that a sound wave needs to travel a distance through a medium, for example, gas. It will be understood that the medium is not limited to gas and could be any medium without departing from the scope of the present inventive concept.

A flowtube 100 having a longer length L generally requires a larger diameter D to reduce pressure drop at high flow rates. Increasing the diameter D of the flowtube 100 can lead to reduced flow velocity resulting in reduced ToF change, which may abrogate sensitivity of the meter and possible sound wave distortion due to a size of the transducer signal face being significantly smaller than the total flow cross section. When the size of the transducer signal face is substantially the same or close to the size of the total flow cross section, spatial averaging occurs at the receiving transducer that mitigates any flow asymmetries. The size of the transducer face is determined by piezo vibration characteristics, so it is a fixed value. Thus, the flowtube diameter D is bounded to a value close to the size of the transducer face.

As further illustrated in FIG. 1, the transducers 105 and 106 are placed directly face to face in the flowtube 100 to make lower power and less sensitive transducers viable. This may result in a direct cost reduction as placing transducers in a signal bounce configuration requires more power and reduces signal fidelity. It will be understood that "directly" face to face implies some room for deviation, but generally means substantially direct.

In some embodiments, a flow conditioner (not shown) may be included in the flowtube. In these embodiments, the presence of the flow conditioner may provide a more consistent flow and possibly decrease sound wave distortion. Example flow conditioners may include four (4) radial vanes down the length of the flowtube or a stepped rod down the center of the flowtube; however, embodiments of the present inventive concept are not limited thereto. However, embodiments of the present inventive concept are not limited to these example configurations.

Figure 3A:
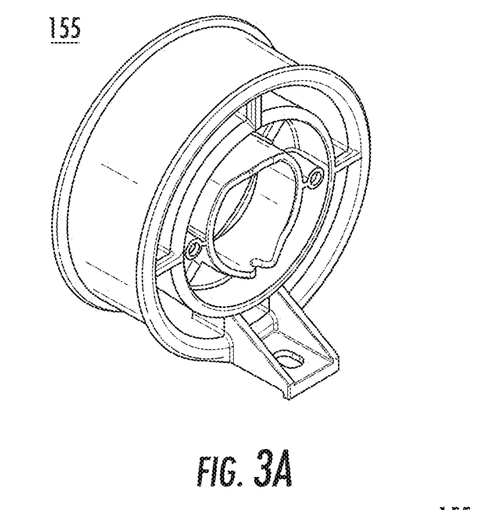
FIG. 3A is a plan view of a baffle at the intake (inlet) side of the flowtube in accordance with some embodiments of the present inventive concept.
Figure 3B:
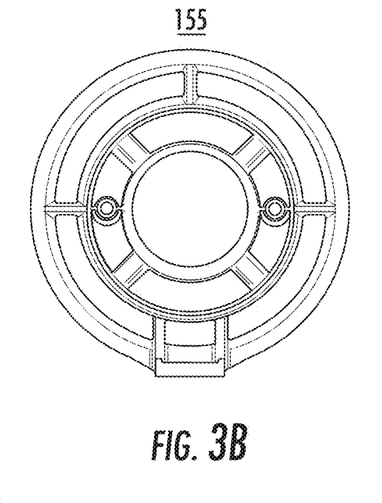
FIG. 3B is a front view of the baffle of the flowtube in accordance with some embodiments of the present inventive concept.
Figure 3C:
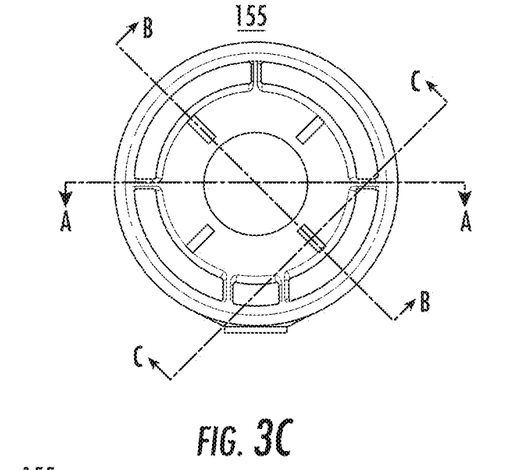
FIG. 3C is a front view of the baffle of the flowtube with measurements in accordance with some embodiments of the present inventive concept.
Figure 3D:
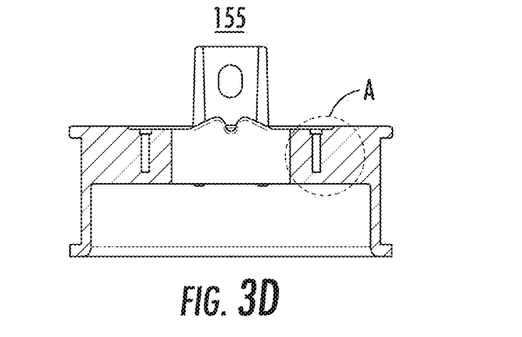
FIG. 3D is a cross section of the baffle along the line A-A of FIG. 3C in accordance with some embodiments of the present inventive concept.
Figure 3E:
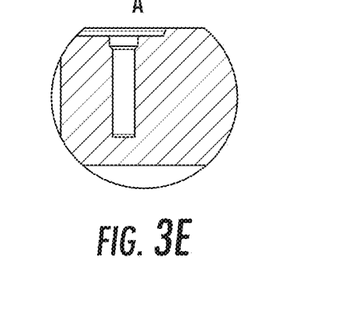
FIG. 3E is an expanded view of the Detail A in FIG. 3D in accordance with some embodiments of the present inventive concept.
Figure 3F:
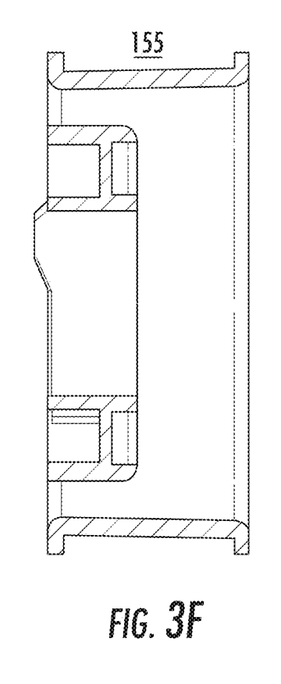
FIG. 3F is a cross section of the baffle along the line B-B of FIG. 3C in accordance with some embodiments of the present inventive concept.
Figure 3G:
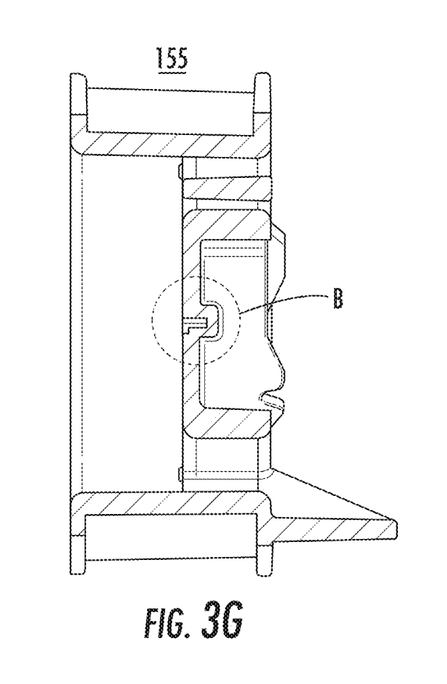
FIG. 3G is a cross section of the baffle along the line C-C of FIG. 3C in accordance with some embodiments of the present inventive concept.
Figure 3H:
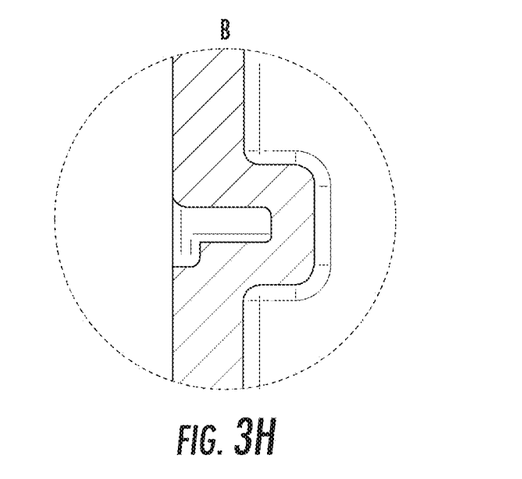
FIG. 3H is an expanded view of the Detail B in FIG. 3G in accordance with some embodiments of the present inventive concept.

Referring now to FIGS. 3A to 3H, diagrams of the a baffle of at the inlet of the flowtube in accordance with embodiments of the present inventive concept will be discussed. FIG. 3A is a plan view of a baffle 155 at the intake 150 side of the flowtube 100 if FIG. 1 in accordance with some embodiments of the present inventive concept. FIG. 3B is a front view of the baffle 155 of the flowtube 100 in accordance with some embodiments of the present inventive concept. FIG. 3C is a front view of the baffle 155 of the flowtube 100 with measurements in accordance with some embodiments of the present inventive concept. FIG. 3D is a cross section of the baffle 155 along the line A-A of FIG. 3C in accordance with some embodiments of the present inventive concept. FIG. 3E is an expanded view of the Detail A in FIG. 3D in accordance with some embodiments of the present inventive concept. FIG. 3F is a cross section of the baffle 155 along the line B-B of FIG. 3C in accordance with some embodiments of the present inventive concept. FIG. 3G is a cross section of the baffle 155 along the line C-C of FIG. 3C in accordance with some embodiments of the present inventive concept. FIG. 3H is an expanded view of the Detail B in FIG. 3G in accordance with some embodiments of the present inventive concept. It will be understood that the baffle 155 at the flowtube inlet 150 illustrated in FIGS. 3A through 3H is provided for example only and embodiments of the present inventive concept are not limited thereto.

Figure 4:
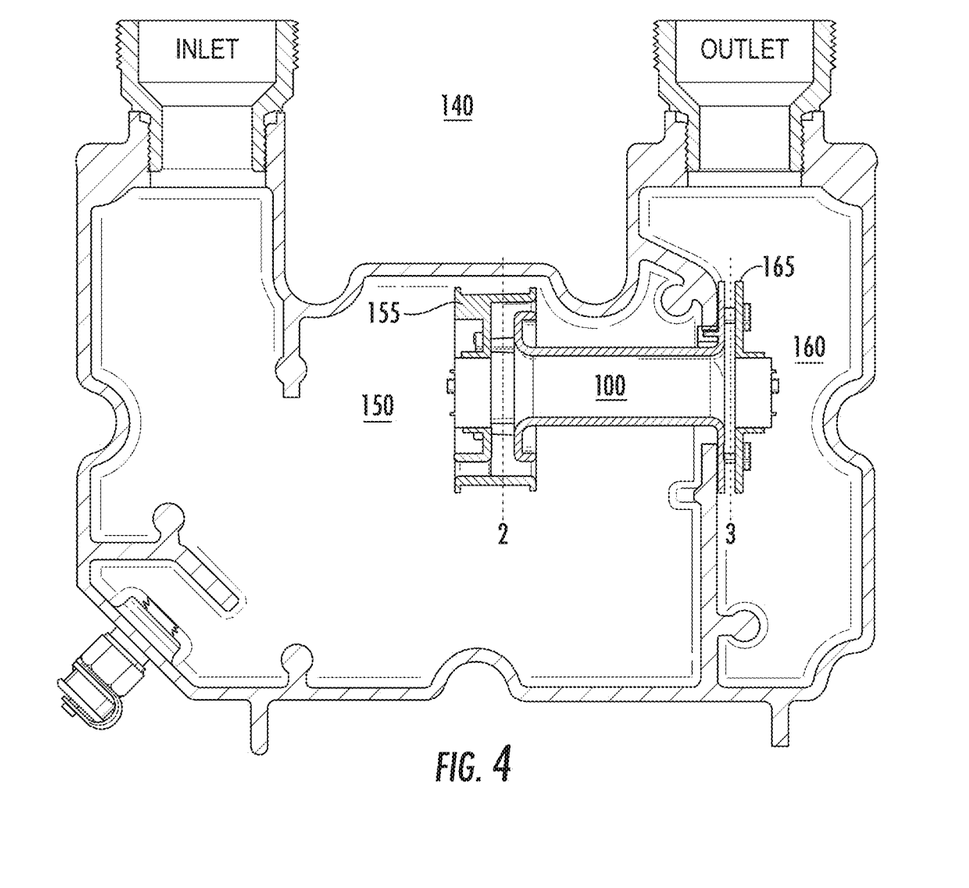
FIG. 4 is a cross section of a meter including a flowtube in accordance with some embodiments of the present inventive concept.
Figure 5:
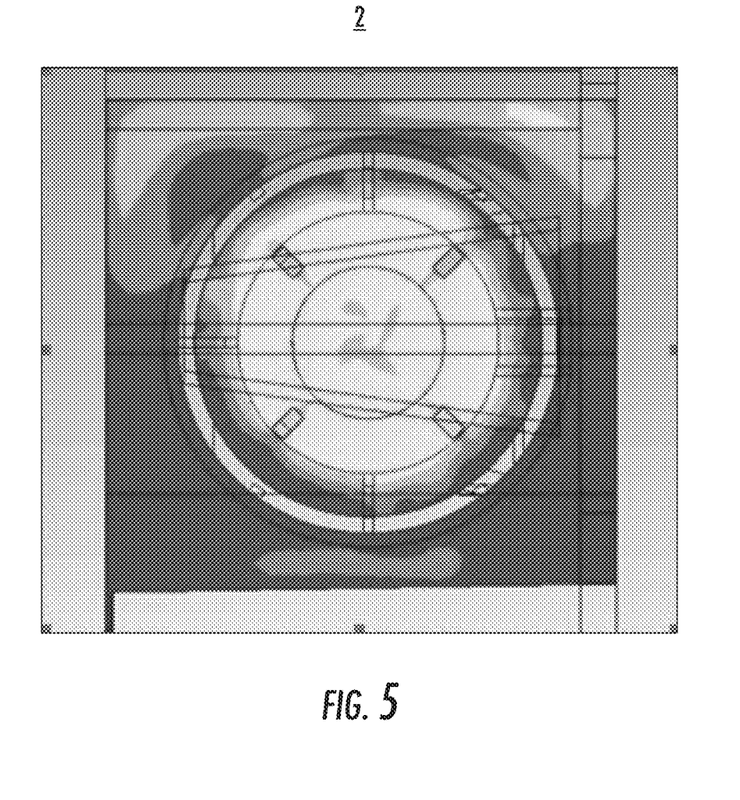
FIG. 5 is a cross section of a flowtube intake profile in accordance with some embodiments of the present inventive concept.
Figure 6:
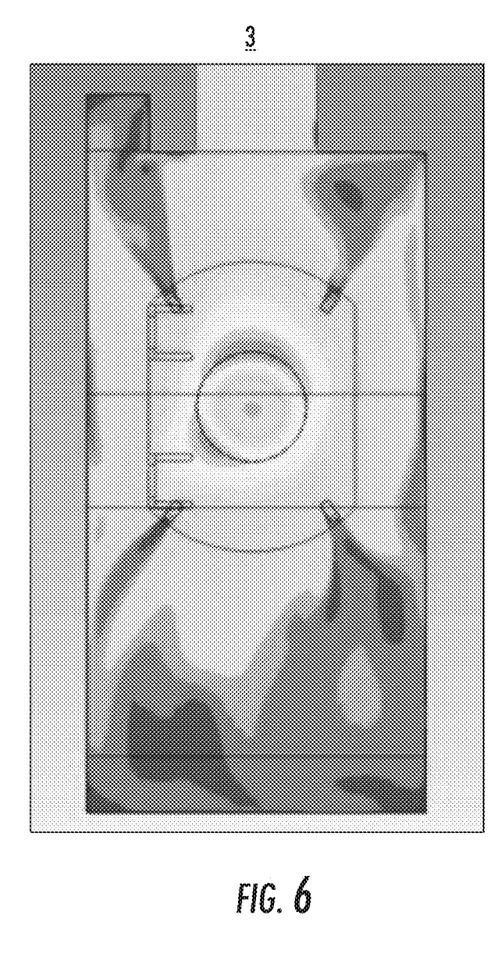
FIG. 6 is a cross section of the flowtube outlet profile in accordance with some embodiments of the present inventive concept.

To improve metrology performance further, the flowtube intake (inlet) is designed to induce radially symmetric flow, i.e. flow velocity is of similar magnitude in all radial directions. This mitigates sound wave distortion to maintain waveform fidelity improving firmware performance. Simulations of flow will now be discussed with respect to FIGS. 4 through 6. FIG. 4 is a cross-section of a dual class meter 140 in accordance with embodiments of the present inventive concept showing locations of the flow profiles discussed below with respect to FIGS. 5 and 6. Referring to FIG. 5, a cross section of the flowtube intake profile (line labeled 2 in FIG. 4) illustrates that flow velocity is of similar magnitude in all radial directions. Referring to FIG. 6, a cross section of the flowtube outlet profile (line labeled 3 in FIG. 4) illustrating that flow velocity decreases radially outward in all directions. This reduces jetting and ensures that the flow is efficiently decelerated to reduce pressure drop. In other words, the flowtube 100 is designed to reduce pressure drop across the meter at high flow rates by configuring the outlet to efficiently decelerate the gas.

Figure 7B:
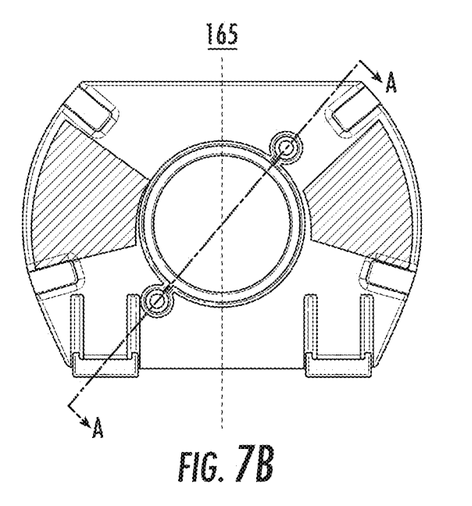
FIG. 7B is a front view of the outlet portion of the flowtube in accordance with some embodiments of the present inventive concept.
Figure 7C:
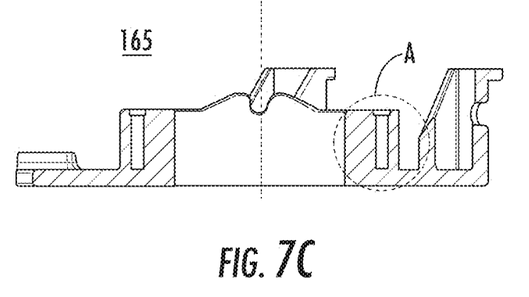
FIG. 7C is a cross section along the line A-A of FIG. 7B of the outlet portion of the flowtube in accordance with some embodiments of the present inventive concept.
Figure 7D:
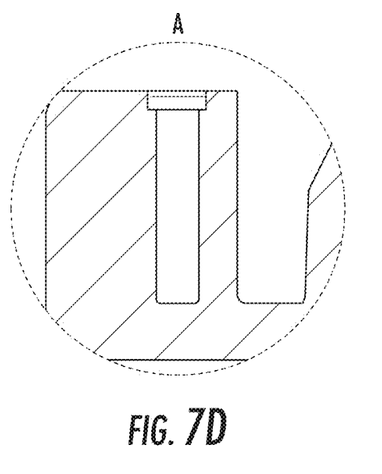
FIG. 7D is an expanded view of Detail A in FIG. 7C in accordance with some embodiments of the present inventive concept.
Figure 7E:
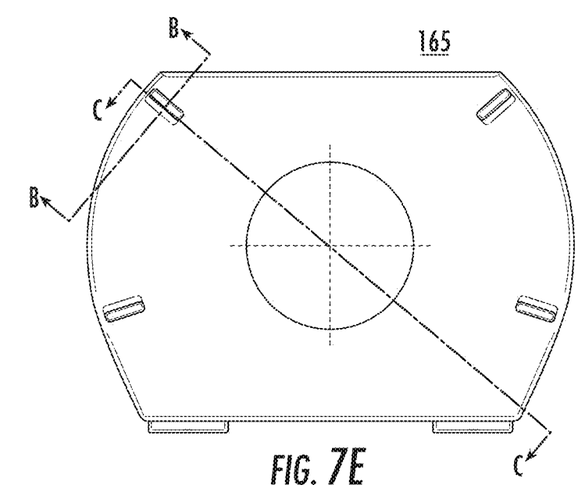
FIG. 7E is a front view of the outlet portion of the flowtube having measurements thereon in accordance with some embodiments of the present inventive concept.
Figure 7F:
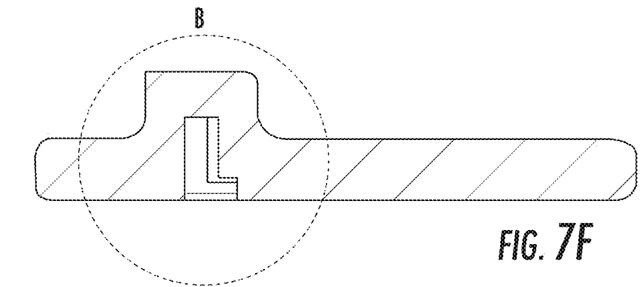
FIG. 7F is a cross section along the line B-B of FIG. 7E of the outlet portion of the flowtube in accordance with some embodiments of the present inventive concept.
Figure 7G:
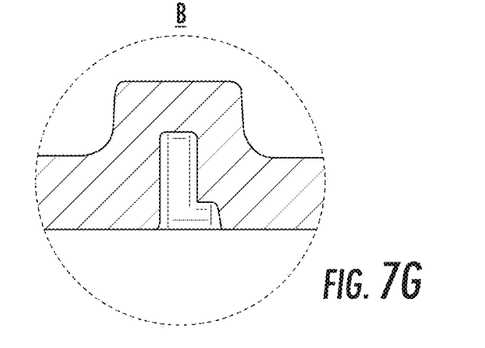
FIG. 7G is an expanded view of Detail B in FIG. 7F in accordance with some embodiments of the present inventive concept.
Figure 7H:
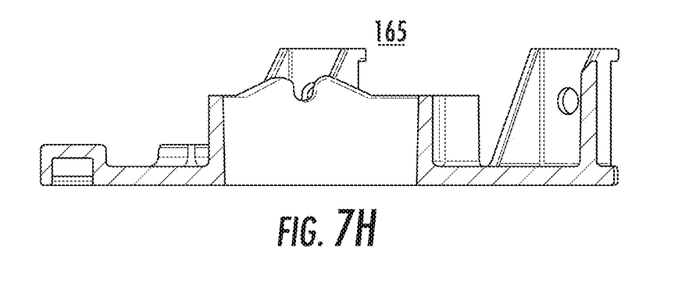
FIG. 7H is a cross section along the line C-C of FIG. 7E of the outlet portion of the flowtube in accordance with some embodiments of the present inventive concept.
Figure 7I:
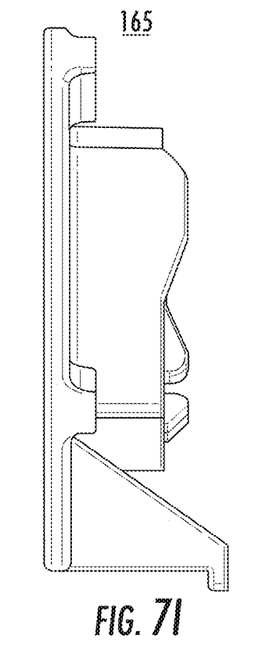
FIGS. 7I and 7J are a side view and top view, respectively, of the outlet portion of the flowtube in accordance with some embodiments of the present inventive concept.
Figure 7J:
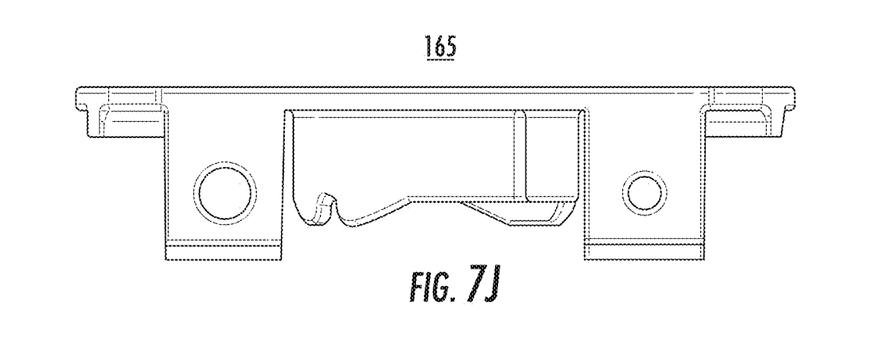

Embodiments of the plate 165 at the flowtube outlet 160 (FIG. 1) design that decelerates the flow as discussed in accordance with some embodiments of the present inventive concept are illustrated in FIGS. 7A through 7J. FIG. 7A is a plan view of the outlet plate portion 165 of the flowtube 100 in accordance with some embodiments of the present inventive concept. FIG. 7B is a front view of the outlet portion 165 of the flowtube 100 in accordance with some embodiments of the present inventive concept. FIG. 7C is a cross section along the line A-A of FIG. 7B of the outlet plate portion 165 of the flowtube 100 in accordance with some embodiments of the present inventive concept. FIG. 7D is an expanded view of Detail A in FIG. 7C in accordance with some embodiments of the present inventive concept. FIG. 7E is a front view of the outlet plate portion of 165 the flowtube 100 having measurements thereon in accordance with some embodiments of the present inventive concept. FIG. 7F is a cross section along the line B-B of FIG. 7E of the outlet plate portion 165 of the flowtube 100 in accordance with some embodiments of the present inventive concept. FIG. 7G is an expanded view of Detail B in FIG. 7F in accordance with some embodiments of the present inventive concept. FIG. 7H is a cross section along the line C-C of FIG. 7E of the outlet plate portion 165 of the flowtube 100 in accordance with some embodiments of the present inventive concept. FIGS. 7I and 7J are a side view and top view, respectively, of the outlet plate portion 165 of the flowtube 100 in accordance with some embodiments of the present inventive concept. It will be understood that the flowtube outlet plate 165 illustrated in FIGS. 7A through 7J is provided for example only and embodiments of the present inventive concept are not limited thereto.

Figures 8A, 8B, 8C:
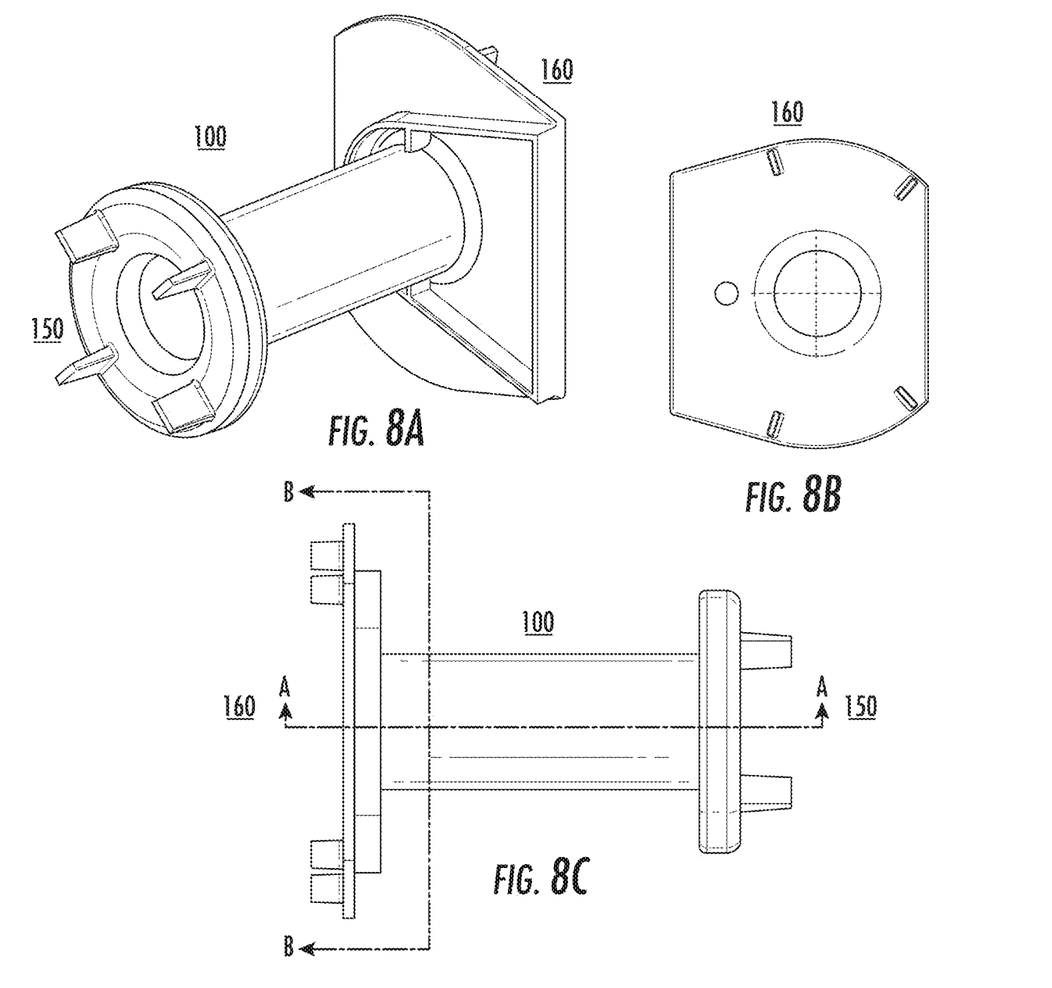
FIG. 8A is a plan view of the entire flowtube without FIGS. 3A and 7A in accordance with some embodiments of the present inventive concept.
FIG. 8B is a view of the outlet portion with FIG. 7A of the flowtube in accordance with some embodiments of the present inventive concept.
FIG. 8C is a side view of the flowtube in accordance with some embodiments of the present inventive concept.
Figure 8D:
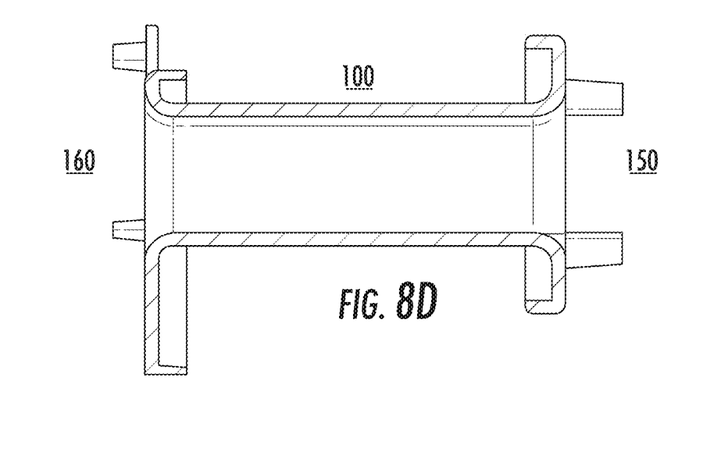
FIG. 8D is a cross section along the line A-A of FIG. 8C in accordance with some embodiments of the present inventive concept.
Figure 8E:
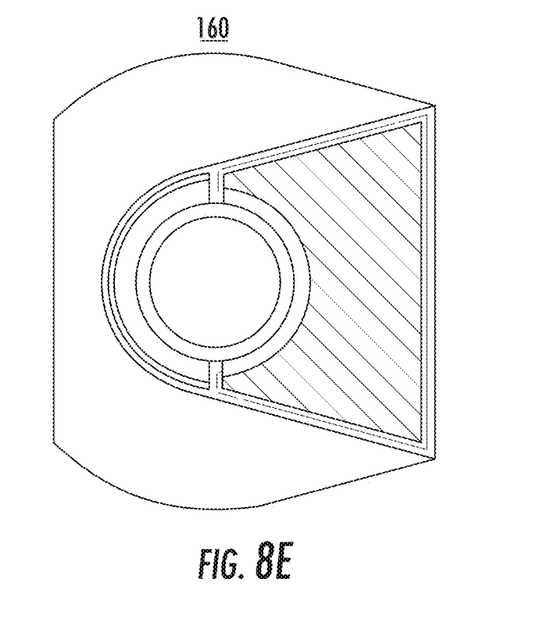
FIG. 8E a cross section along the line B-B of FIG. 8C in accordance with some embodiments of the present inventive concept.
Figure 8F:
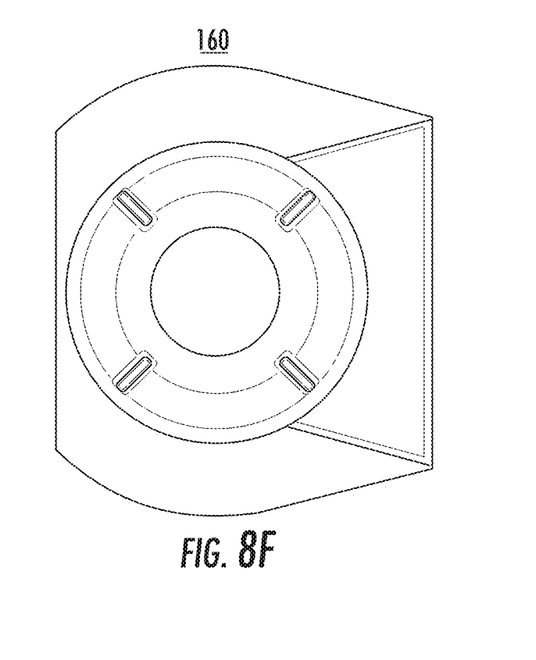
FIG. 8F is a cross section of the outlet portion without FIG. 7A of the flowtube in accordance with some embodiments of the present inventive concept.

Illustrations of some embodiments of a flowtube in accordance with embodiments of the inventive concept are illustrated in FIGS. 8A through 8F. FIG. 8A is a plan view of the flowtube 100 without the baffle 155 at the inlet 150 and the plate 165 at the outlet in accordance with some embodiments of the present inventive concept. FIG. 8B is a view of the outlet portion 160 of the flowtube 100 in accordance with some embodiments of the present inventive concept. FIG. 8C is a side view of the flowtube 100 in accordance with some embodiments of the present inventive concept. FIG. 8D is a cross section of the flowtube 100 along the line A-A of FIG. 8C in accordance with some embodiments of the present inventive concept. FIG. 8E a cross section of the flowtube 100 along the line B-B of FIG. 8C in accordance with some embodiments of the present inventive concept. FIG. 8F is a cross section of the outlet portion 160 of the flowtube in accordance with some embodiments of the present inventive concept. It will be understood that the flowtube illustrated in FIGS. 8A through 8F is provided for example only and embodiments of the present inventive concept are not limited thereto.

Figure 9:
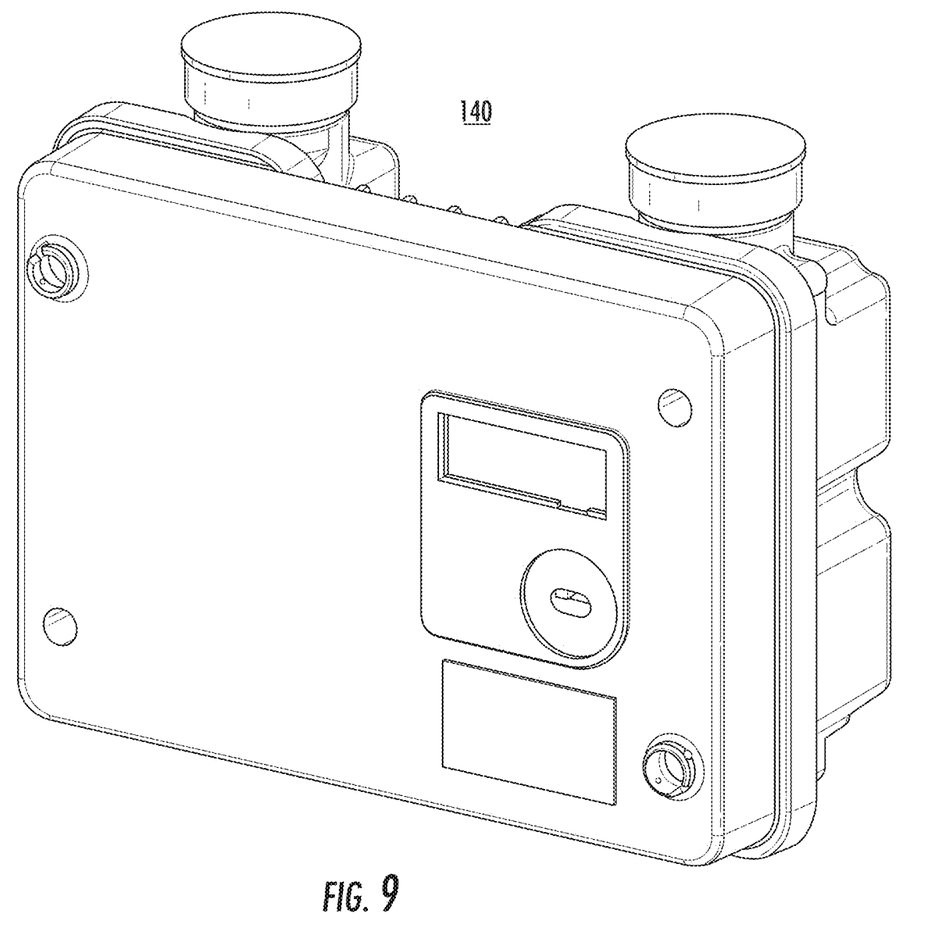
FIG. 9 is a diagram of a dual class meter including a flowtube in accordance with some embodiments of the present inventive concept.

FIG. 9 is a diagram of a completed dual class meter in accordance with some embodiments of the present inventive concept. This dual class meter includes a flowtube as discussed herein. FIG. 9 is provided as an example only and, therefore, embodiments of the present inventive concept are not limited thereto.

Although embodiments of the present inventive concept are discussed herein with respect to gas, embodiments of the present inventive concept are not limited thereto. Embodiments discussed herein can be used in any type of meter where the inventive concept is deemed useful without departing from the scope of the present inventive concept.

As discussed briefly above, embodiments of the present inventive concept provide a meter capable of operation in multiple classes, for example, the 200 and 400 flow classes. The design of the meter and the flowtube have been tailored to handle both classes. As discussed above, the face to face transducer design maximizes the sound wave velocity at all flow rates; the length of the flowtube has been chosen such that the flowtube is as short as possible without sacrificing flow accuracy; the flowtube intake is configured to optimize radially symmetric flow; and the flowtube outlet is designed to efficiently decelerate the gas upon exit of the flowtube.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An ultrasonic meter that operates in multiple classes, the ultrasonic meter comprising:
    a flowtube positioned in the ultrasonic meter and having an inlet at a first end and an outlet at a second end, opposite the first end; and
    first and second face to face transducers, the first transducer being positioned at the first end of the flowtube and the second transducer being positioned at the second end of the flowtube, wherein the first and second face to face transducers are positioned in line with flow through the ultrasonic meter.

2. The ultrasonic meter of claim 1, wherein positioning the first and second transducers face to face increases a difference between upstream and downstream sound wave velocities in the flowtube and increased measurement sensitivity.

3. The ultrasonic meter of claim 1, wherein a length (L) of the flowtube from a face of the first transducer to a face of the second transducer is configured to be as short as possible without having an effect on flow accuracy through the flowtube.

4. The ultrasonic meter of claim 3, wherein the length L of the flowtube is from about 50 to about 100 mm.

5. The ultrasonic meter of claim 1, wherein a diameter of the flowtube has a similar size relative to a size of faces of the first and second transducers.

6. The ultrasonic meter of claim 1, wherein the inlet of the flowtube induces radially symmetric flow of a medium through the flowtube.

7. The ultrasonic meter of claim 1, wherein the outlet of the flowtube efficiently decelerates the flow.

8. The ultrasonic meter of claim 1, wherein the outlet of the decreases flow velocity radially outward in all directions.

9. The ultrasonic meter of claim 1, wherein the ultrasonic meter is an ultrasonic gas meter.

10. The ultrasonic meter of claim 1, wherein the ultrasonic meter operates in both low flow and high flow classes.

11. A flowtube for an ultrasonic meter operates in multiple classes, the flowtube comprising:
    an inlet at a first end and an outlet at a second end, opposite the first end,
    wherein first and second face to face transducers are positioned at the first end of the flowtube and the second end of the flowtube, respectively; and
    wherein the first and second face-to-face transducers are positioned in line with flow through the ultrasonic meter.

12. The flowtube of claim 11, wherein positioning the first and second transducers face to face increases a difference between upstream and downstream sound wave velocities in the flowtube and increased measurement sensitivity.

13. The flowtube of claim 11, wherein a length (L) of the flowtube from a face of the first transducer to a face of the second transducer is as short as possible without having an effect on flow accuracy through the flowtube.

14. The flowtube of claim 13, wherein the length L of the flowtube is from about 50 to about 100 mm.

15. The flowtube of claim 11, wherein a diameter of the flowtube has a similar size relative to a size of faces of the first and second transducers.

16. The flowtube of claim 11, wherein the inlet of the flowtube induces radially symmetric flow of a medium through the flowtube.

17. The flowtube of claim 11, wherein the outlet of the flowtube decelerates the flow.

18. The flowtube of claim 11, wherein the outlet of the flowtube decreases flow velocity radially outward in all directions.

19. The flowtube of claim 11, wherein the ultrasonic meter is an ultrasonic gas meter.

20. The flowtube of claim 11, wherein the ultrasonic meter is operates in both low flow and high flow classes.

* * * * *

UNITED STATES PATENT AND TRADEMARK OFFICE
CERTIFICATE OF CORRECTION

PATENT NO. : 10,866,127 B2  
APPLICATION NO. : 16/252026  
DATED : December 15, 2020  
INVENTOR(S) : Healy et al.

Page 1 of 14

It is certified that error appears in the above-identified patent and that said Letters Patent is hereby corrected as shown below:

On the Title Page

Column 2, (56) References Cited, Foreign Patent Documents Line 12:  
Please correct "CN 207 963 973 U 0/2018" to read -- CN 207 963 973 U 10/2018 --.

In the Drawings

The solid lines in the drawings appear as dotted lines. The drawings should be replaced with the attached Replacement Sheets (Figures 1-9).

In the Claims

Column 8, Claim 8, Line 43:  
Please correct "the decreases" to read -- the flowtube decreases --.

Column 9, Claim 20, Line 15:  
Please correct "is operates" to read -- operates --.

Signed and Sealed this  
Nineteenth Day of January, 2021

Andrei Iancu  
*Director of the United States Patent and Trademark Office*

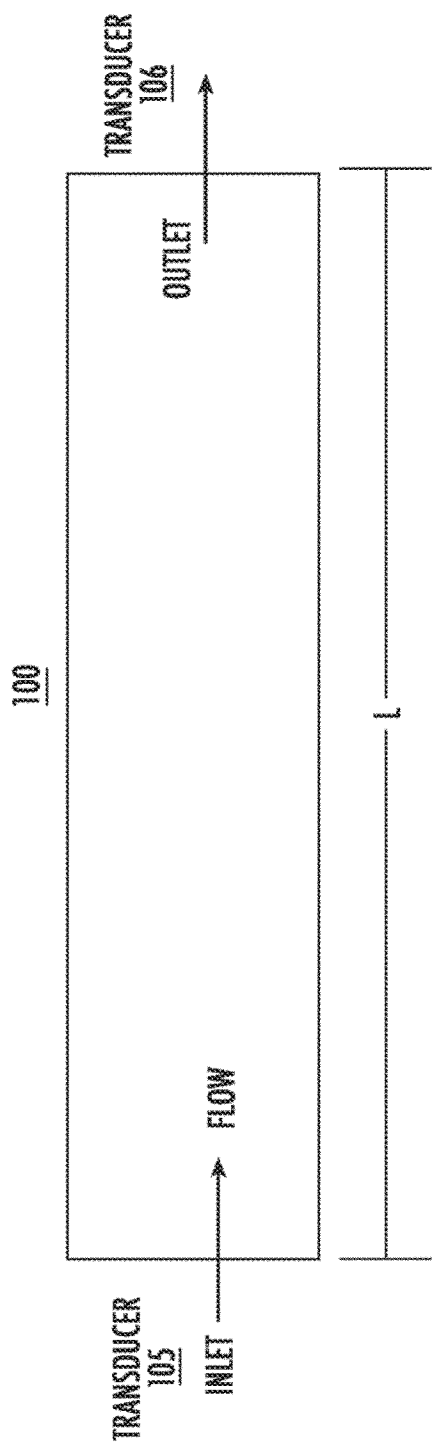
FIG. 2A
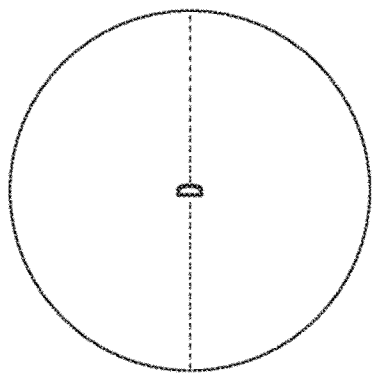
FIG. 2B

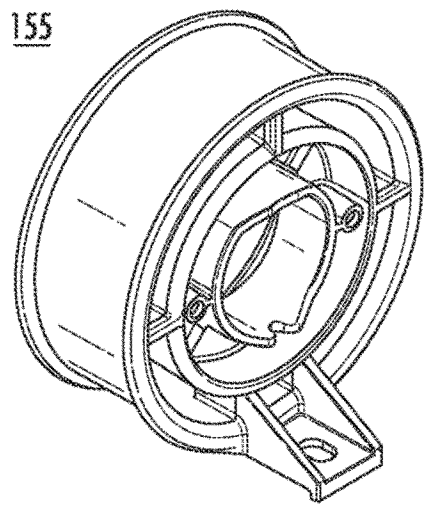
FIG. 3A
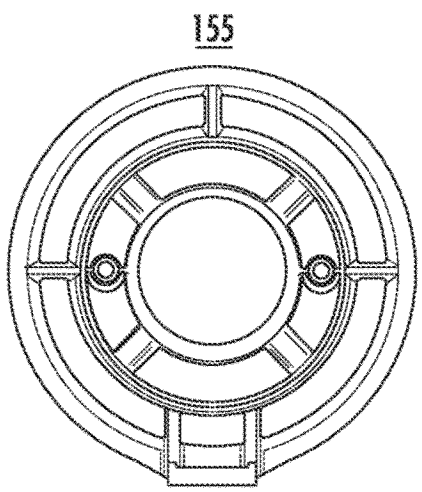
FIG. 3B
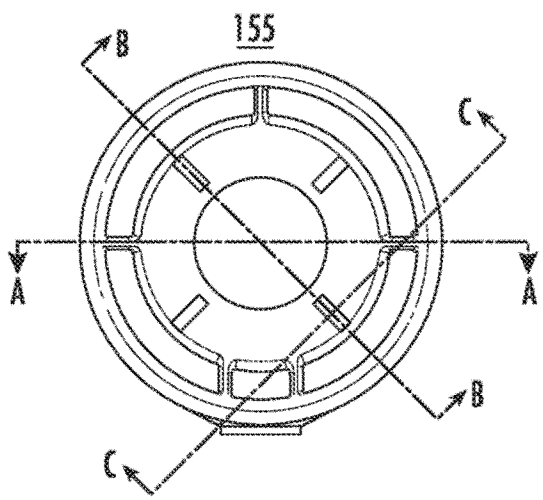
FIG. 3C
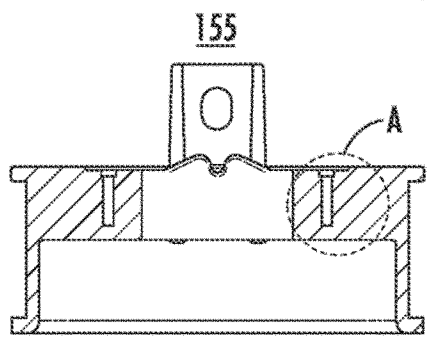
FIG. 3D
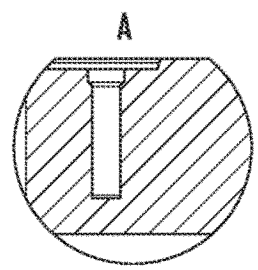
FIG. 3E

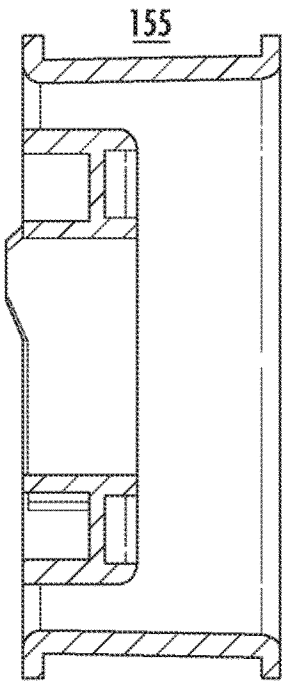
FIG. 3F
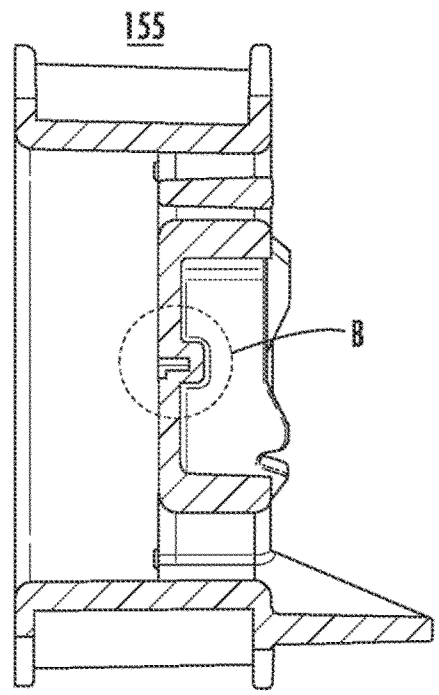
FIG. 3G
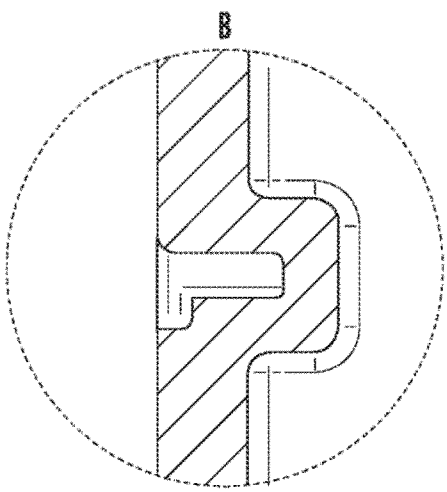
FIG. 3H

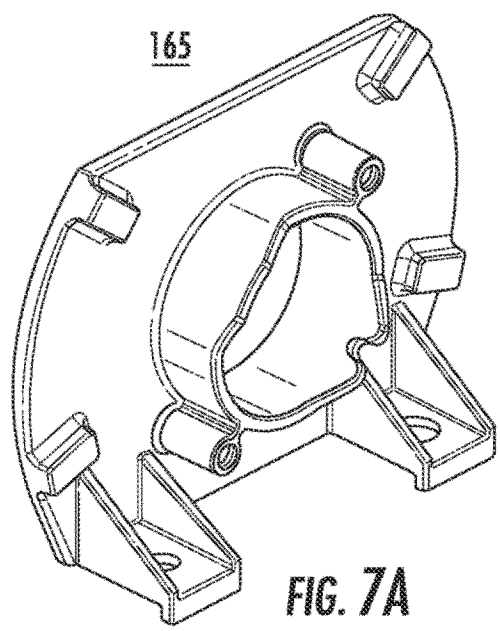
FIG. 7A
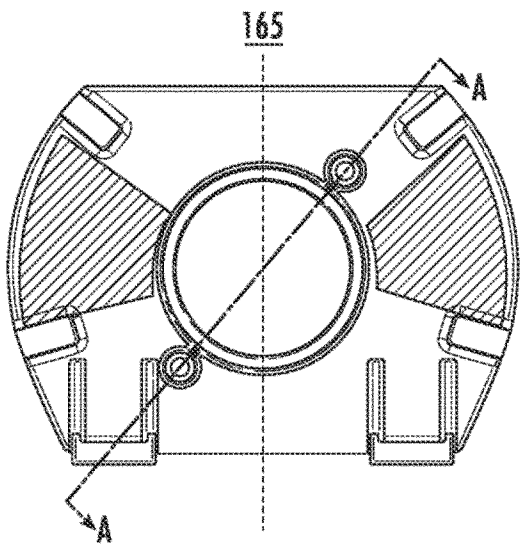
FIG. 7B
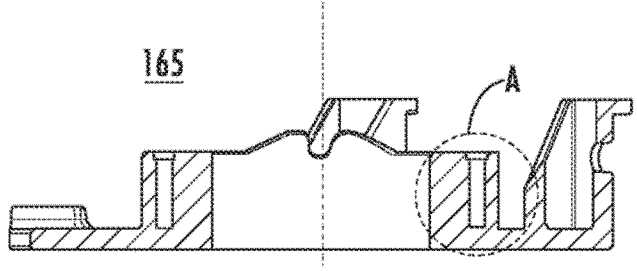
FIG. 7C
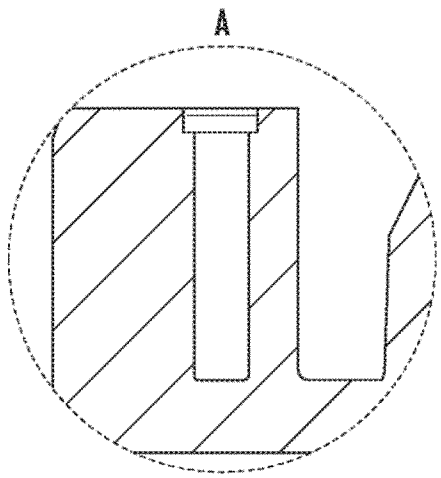
FIG. 7D

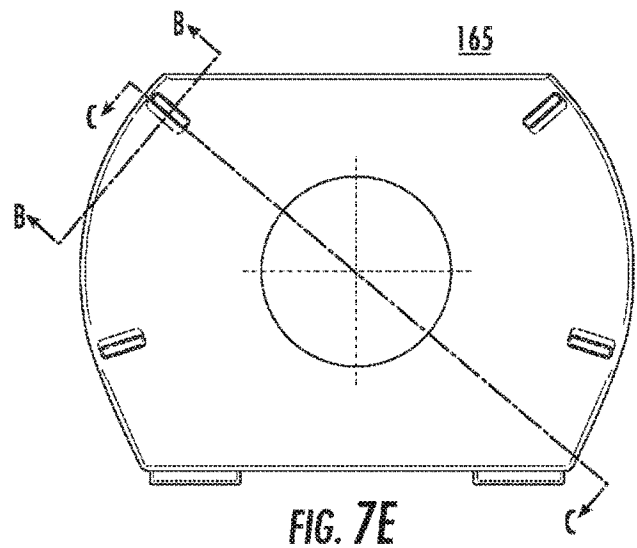
FIG. 7E
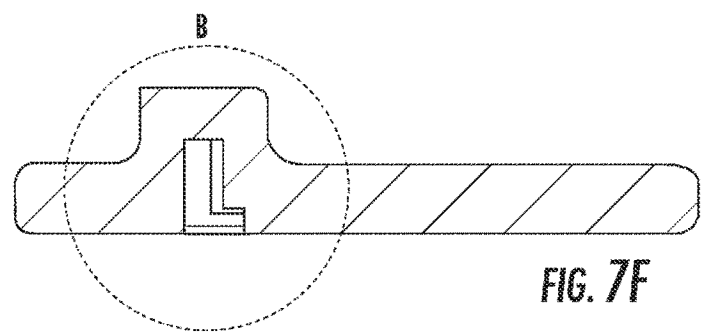
FIG. 7F
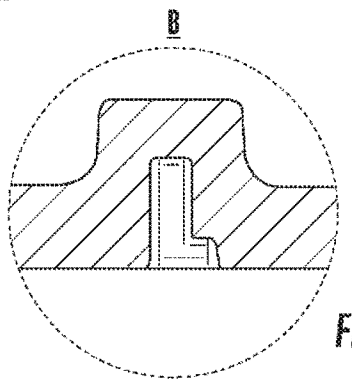
FIG. 7G
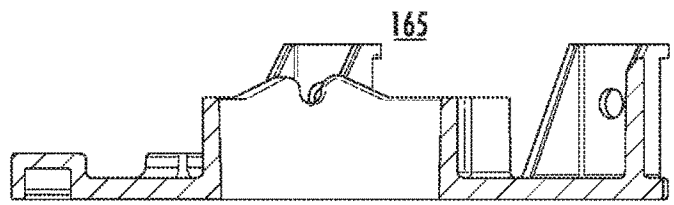
FIG. 7H

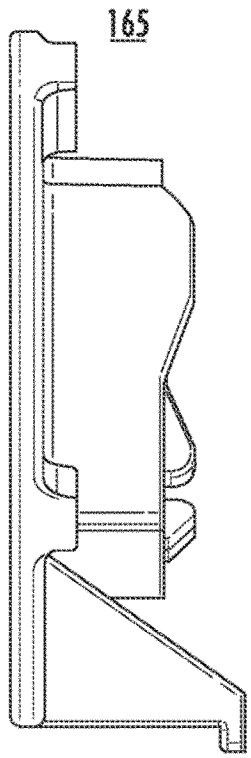
FIG. 7I
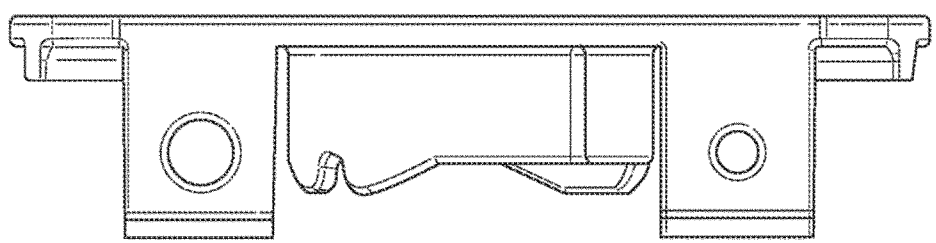
FIG. 7J

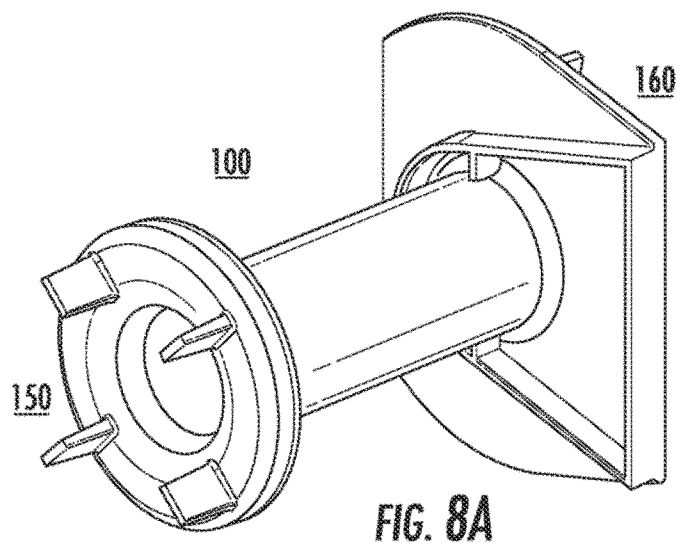
FIG. 8A
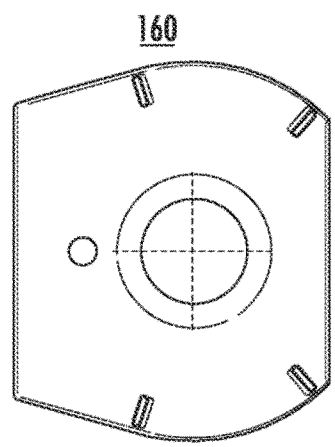
FIG. 8B
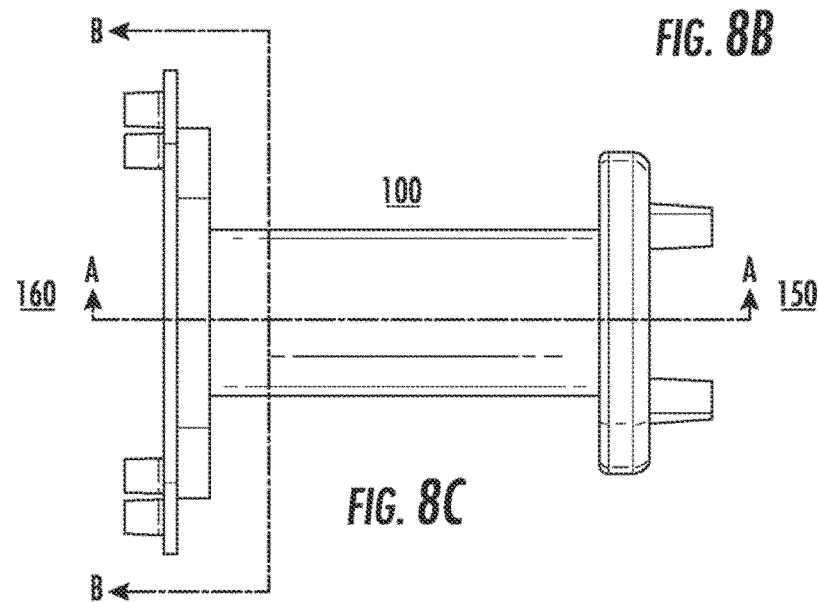
FIG. 8C
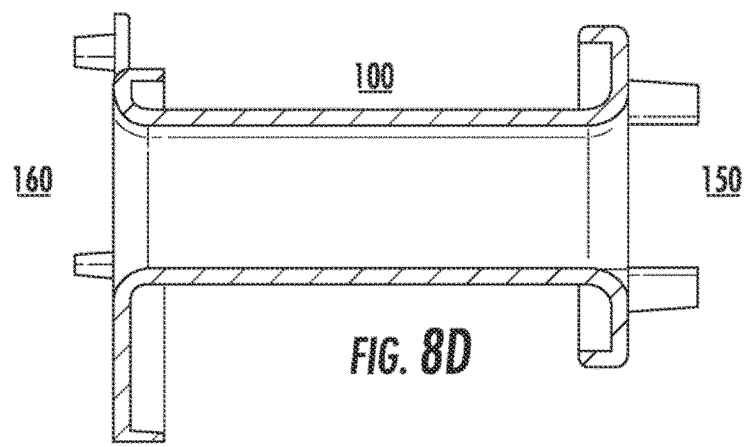
FIG. 8D

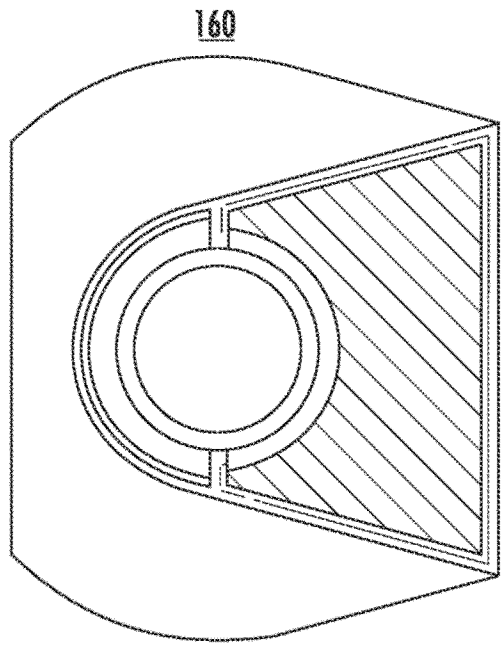
FIG. 8E
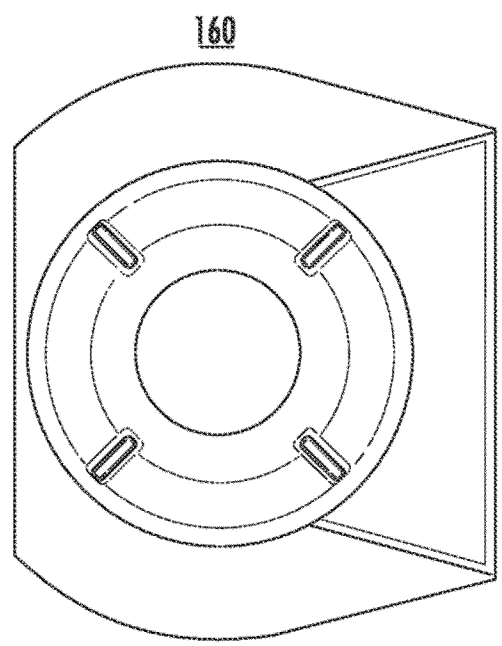
FIG. 8F